United States Patent
Inoue et al.

(10) Patent No.: US 8,248,083 B2
(45) Date of Patent: Aug. 21, 2012

(54) PROCESSING DEVICE FOR PIEZOELECTRIC ACTUATOR AND PROCESSING METHOD FOR PIEZOELECTRIC ACTUATOR

(75) Inventors: Masaru Inoue, Yokohama (JP); Osamu Okawara, Yokohama (JP); Hideki Fuchino, Yokohama (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 311 days.

(21) Appl. No.: 12/759,804

(22) Filed: Apr. 14, 2010

(65) Prior Publication Data
US 2010/0264934 A1   Oct. 21, 2010

(30) Foreign Application Priority Data
Apr. 20, 2009   (JP) .................................. 2009-102124

(51) Int. Cl.
*G01R 27/26* (2006.01)
(52) U.S. Cl. ........ 324/658; 324/537; 324/555; 324/727; 360/244
(58) Field of Classification Search .................. 324/537, 324/555, 727, 658; 360/244
See application file for complete search history.

(56) References Cited

U.S. PATENT DOCUMENTS

| 6,975,123 B1 * | 12/2005 | Malang et al. ................ 324/658 |
| 2003/0076121 A1 * | 4/2003 | Guo et al. ..................... 324/727 |
| 2004/0233568 A1 * | 11/2004 | Rao et al. ........................ 360/75 |

FOREIGN PATENT DOCUMENTS

| JP | 2002-184140 A | 6/2002 |
| JP | 2003-141832 A | 5/2003 |

* cited by examiner

*Primary Examiner* — Arleen M Vazquez
(74) *Attorney, Agent, or Firm* — Holtz, Holtz, Goodman & Chick, PC

(57) ABSTRACT

A processing device is provided with a circuit connected to a first conductive portion and a second conductive portion. An AC voltage source produces an AC waveform voltage obtained by adding a bias voltage to an AC voltage for capacitance measurement. The AC waveform voltage is applied between the first conductive portion and the second conductive portion through the measurement probes. The moment the AC waveform voltage is applied to the circuit with a switch closed, an inrush current flows through the circuit based on a potential difference of the bias voltage. This inrush current causes dielectric breakdown in the conductive resin, thereby securing the continuity of the conductive resin. With the continuity of the conductive resin secured, a capacitance of the piezoelectric body is measured by the AC waveform voltage, and it is determined whether or not the piezoelectric body is normal.

2 Claims, 3 Drawing Sheets

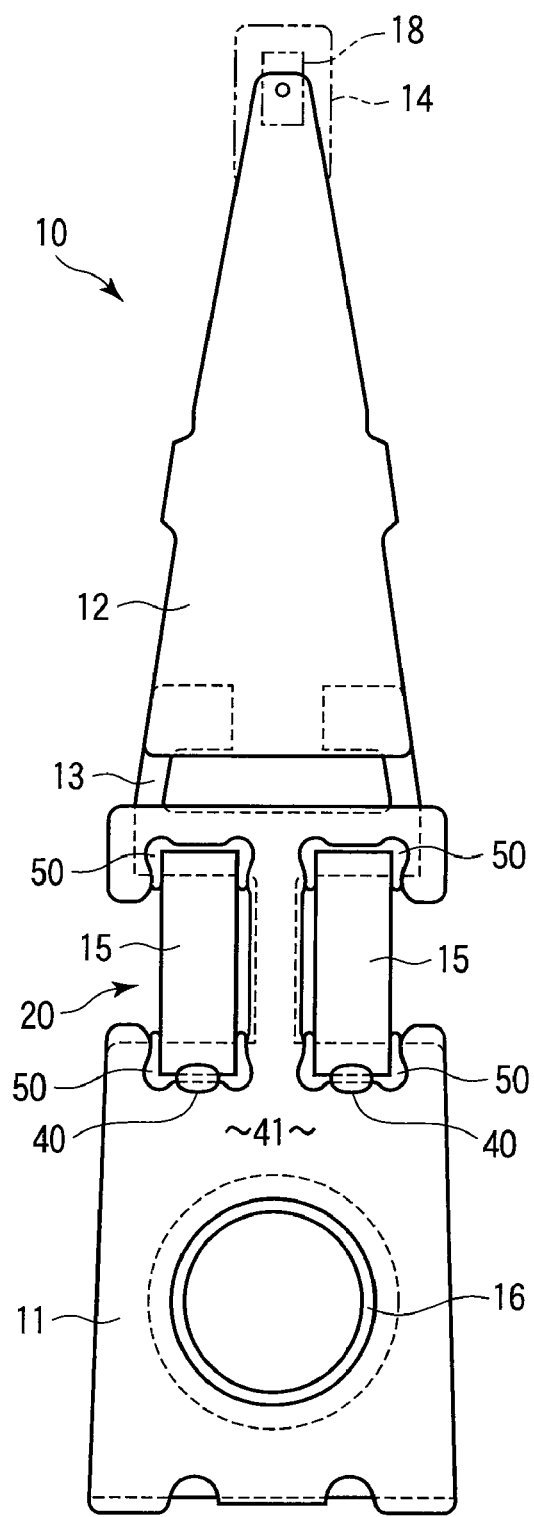
F I G. 1

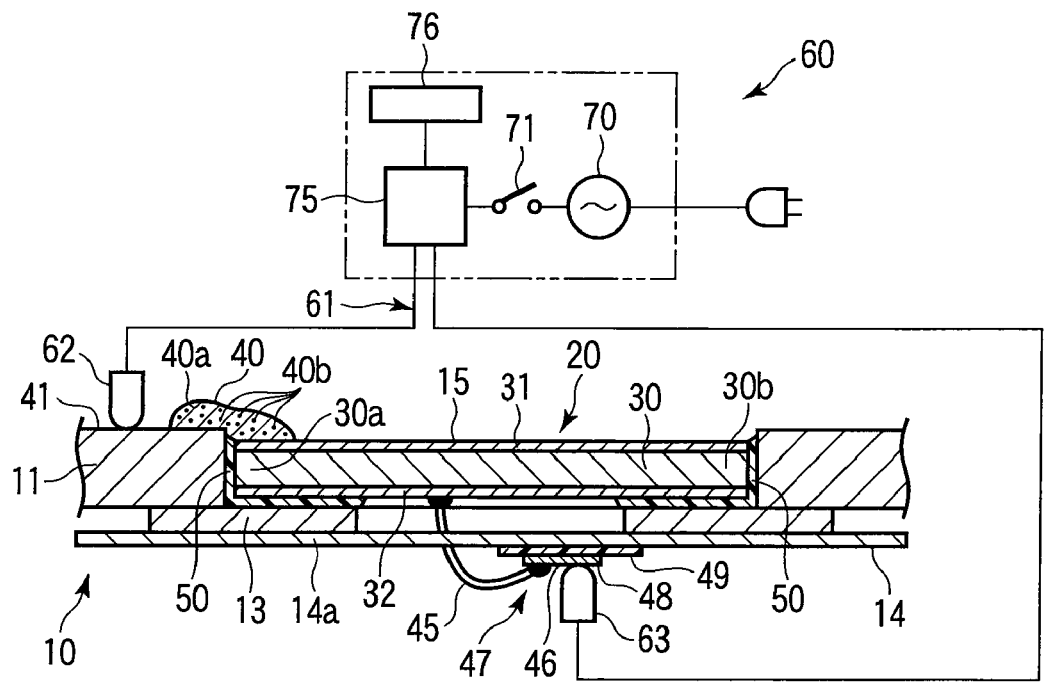
F I G. 2
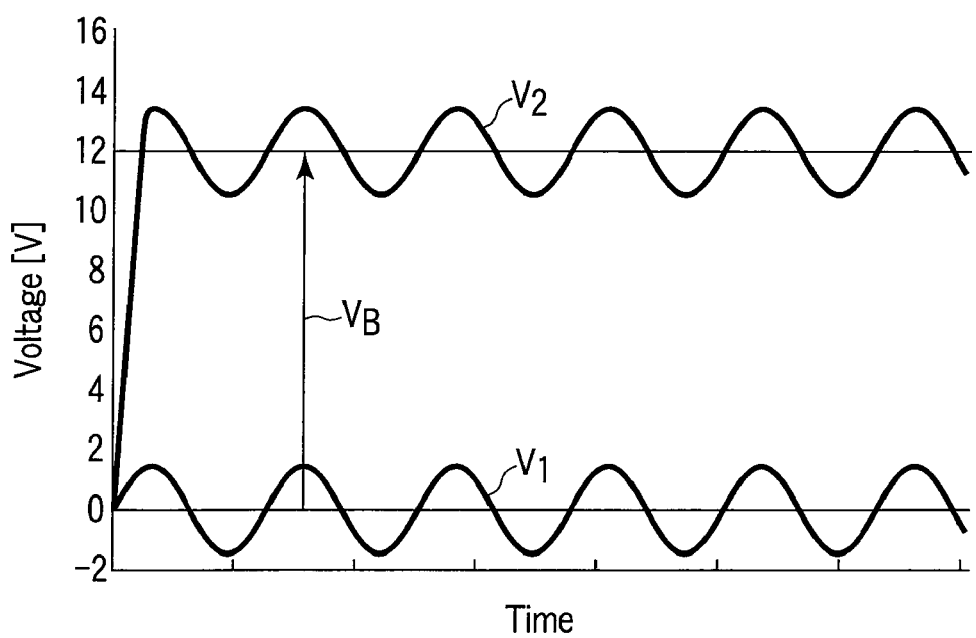
F I G. 3

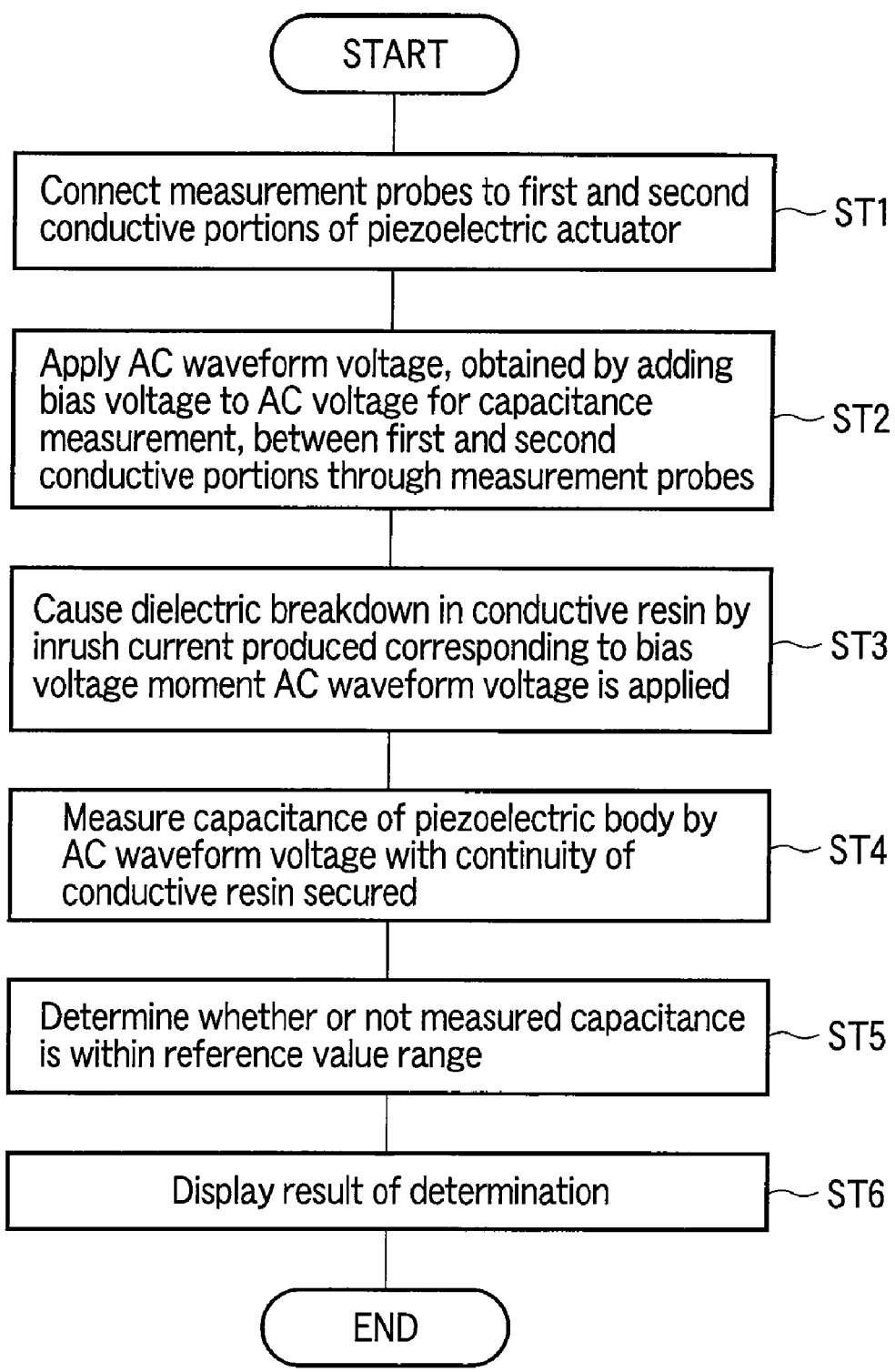
F I G. 4

PROCESSING DEVICE FOR PIEZOELECTRIC ACTUATOR AND PROCESSING METHOD FOR PIEZOELECTRIC ACTUATOR

CROSS-REFERENCE TO RELATED APPLICATIONS

This application is based upon and claims the benefit of priority from prior Japanese Patent Application No. 2009-102124, filed Apr. 20, 2009, the entire contents of which are incorporated herein by reference.

BACKGROUND OF THE INVENTION

1. Field of the Invention

The present invention relates to a processing device and method for a piezoelectric actuator used, for example, to inspect piezoelectric bodies of a disk drive suspension provided with piezoelectric actuators.

2. Description of the Related Art

A hard disk drive (HDD) is used in an information processing device, such as a personal computer. The disk drive comprises a magnetic disk that rotates around a spindle, actuator arm, positioning motor, etc. The actuator arm is configured to be turned transversely relative to the tracks of the disk around a pivot by the positioning motor. A suspension is mounted on the actuator arm. A slider that constitutes a magnetic head is disposed on the distal end portion of the suspension.

A DSA suspension (suspension with dual-stage actuator) is proposed to cope with the increase in the recording density of a hard disk drive. An example of the DSA suspension is disclosed in Jpn. Pat. Appln. KOKAI Publication No. 2002-184140 (Patent Document 1). This suspension comprises an actuator arm, which is turned by a positioning motor, and a piezoelectric actuator (microactuator), which comprises a piezoelectric body. The piezoelectric actuator is adapted to move the suspension transversely relative to the tracks of a disk at high speed for an infinitesimal distance.

A piezoelectric body of, for example, lead zirconate titanate (PZT) is used for the piezoelectric actuator. This piezoelectric body is disposed between first and second electrodes. The first electrode is connected to a first conductive portion by a conductive resin, such as silver paste. The second electrode is connected to a second conductive portion. The conductive resin comprises a matrix resin and metallic fillers of silver particles or the like mixed in the matrix resin.

If the piezoelectric body in the disk drive suspension with the piezoelectric actuator is cracked, its properties are degraded. If the properties of the piezoelectric body are degraded, the suspension cannot display its predetermined performance. Thus, in a suspension inspection step, the properties of the piezoelectric body are checked for normality. For example, Jpn. Pat. Appln. KOKAI Publication No. 2003-141832 (Patent Document 2) discloses a disk drive that can determine whether or not a piezoelectric body is normal. In this disk drive, an AC voltage is applied to the piezoelectric body, and the capacitance (or electrostatic capacity) of the piezoelectric body is detected.

Depending on the mixing condition of the metallic fillers in the matrix resin of the conductive resin in the piezoelectric body, the value of electrical resistance may vary due to insufficient conduction between the fillers. The variation of the electrical resistance value not a little influences the result of the inspection. In some cases, therefore, a step of causing dielectric breakdown in the metallic fillers may be performed before the capacitance of the piezoelectric body is measured.

If a relatively high voltage (e.g., 12V DC) is applied to the conductive resin, for example, dielectric breakdown occurs between the metallic fillers. By this dielectric breakdown, the continuity of the conductive resin can be secured, and the value of electrical resistance can be stabilized.

Conventionally, as mentioned before, the step of causing dielectric breakdown by applying the relatively high DC voltage to the conductive resin and the step of measuring the capacity of the piezoelectric body by the AC voltage are performed separately. Thus, the operation for inspecting the piezoelectric body takes a lot of time and labor.

BRIEF SUMMARY OF THE INVENTION

The object of the present invention is to provide a processing device and method, capable of efficiently performing a step of causing dielectric breakdown in a conductive resin and a step of measuring the capacitance of a piezoelectric body of a disk drive suspension, in inspecting the piezoelectric body.

A piezoelectric actuator comprises a piezoelectric body disposed between a first electrode and a second electrode, an electrically conductive resin attached to the first electrode and comprising a matrix resin doped with a metallic filler, a first conductive portion conducting to the first electrode through the conductive resin, and a second conductive portion electrically insulated from the first conductive portion and conducting to the second electrode.

A processing device for processing the piezoelectric actuator comprises a circuit connected to the first conductive portion and the second conductive portion through measurement probes, an AC voltage source which applies an AC waveform voltage, obtained by adding a bias voltage to an AC voltage for capacitance measurement, between the first conductive portion and the second conductive portion through the measurement probes, inrush current generating means for causing dielectric breakdown in the conductive resin by means of an inrush current produced in the circuit, based on a potential difference of the bias voltage, thereby securing conduction, the moment the AC waveform voltage is applied, determination means for measuring a capacitance of the piezoelectric body by the AC waveform voltage, with the continuity of the conductive resin secured, and determining whether or not the piezoelectric body is normal, based on the measured capacitance, and display means for displaying a result of the determination.

A processing method for processing the piezoelectric actuator comprises a step (ST1) of forming a circuit by causing measurement probes to contact the first conductive portion and the second conductive portion, a step (ST2) of applying an AC waveform voltage, obtained by adding a bias voltage to an AC voltage for capacitance measurement, to the circuit, a step (ST3) of causing dielectric breakdown in the conductive resin by means of an inrush current produced in the circuit, based on a potential difference of the bias voltage, thereby securing conduction, the moment the AC waveform voltage is applied, a step (ST4) of measuring a capacitance of the piezoelectric body by the AC waveform voltage, with the continuity of the conductive resin secured after the inrush current is produced, a step (ST5) of determining whether or not the piezoelectric body is normal, based on the measured capacitance, and a step (ST6) of displaying a result of the determination.

According to the processing device and method described above, a step of stabilizing the value of electrical resistance of the conductive resin in the piezoelectric actuator and the step of measuring the capacitance of the piezoelectric body of the disk drive suspension comprising the piezoelectric actuator can be efficiently performed in a short time, in inspecting the piezoelectric body.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a plan view showing an example of a disk drive suspension with piezoelectric actuators;

FIG. 2 is a diagram typically showing a processing device according to one embodiment of the invention along with a partial section of the suspension;

FIG. 3 is a waveform diagram showing an AC waveform voltage of the processing device shown in FIG. 2; and FIG. 4 is a flowchart showing an example of a flow of processing by the processing device shown in FIG. 2.

DETAILED DESCRIPTION OF THE INVENTION

One embodiment of the present invention will now be described with reference to FIGS. 1 to 4.

FIG. 1 shows an example of a disk drive suspension (hereinafter simply referred to as a "suspension") 10. The suspension 10 comprises a baseplate 11, load beam 12, springy hinge member 13, flexure 14 disposed along the load beam 12, and a pair of piezoelectric actuators 15. The piezoelectric actuators 15 function as microactuators.

The baseplate 11 is formed of an electrically conductive material, such as stainless steel. The baseplate 11 is provided with a boss portion 16. The boss portion 16 is fixed to the distal end portion of an actuator arm (not shown). The actuator arm is turned by a positioning motor.

The load beam 12 is formed of an electrically conductive material, such as stainless steel. The flexure 14 is provided with a metal base 14a (FIG. 2). The metal base 14a is formed of a precise, thin metallic plate spring thinner than the load beam 12. The flexure 14 is laid over the load beam 12. A slider 18 that constitutes a magnetic head is disposed on the distal end portion of the flexure 14.

As shown in FIG. 1, the pair of piezoelectric actuators 15 are contained substantially parallel to each other in an opening 20 formed in the baseplate 11. As shown in FIG. 2, each piezoelectric actuator 15 comprises a piezoelectric body 30, first electrode 31, and second electrode 32. The first electrode 31 is disposed on one surface of the piezoelectric body 30. The second electrode 32 is disposed on the other surface of the piezoelectric body 30. The piezoelectric body 30 is a plate of piezoelectric ceramics, such as lead zirconate titanate (PZT).

The first electrode 31 is formed on the one surface of the piezoelectric body 30 by sputtering or plating. The second electrode 32 is formed on the other surface of the piezoelectric body 30 by sputtering or plating. The first electrode 31 is connected to a first conductive portion 41 through an electrically conductive resin 40. An example of the first conductive portion 41 consists of a part of the baseplate 11. However, some conductor other than the baseplate 11 may be used for the first conductive portion 41.

An example of the conductive resin 40 is silver paste. Specifically, the conductive resin 40 comprises a pasty matrix resin 40a and metallic fillers 40b formed of silver particles mixed in the matrix resin 40a. The conductive resin 40 is spread in an uncured state over the first electrode 31 and first conductive portion 41 by a previous coating process. When the conductive resin 40 is cured, thereafter, it is fixed to the electrode 31 and conductive portion 41.

Depending on the mixing condition of the metallic fillers 40b in the conductive resin 40, the value of electrical resistance may vary due to insufficient conduction between the fillers 40b. If a voltage (e.g., 12 V) higher than a threshold value is applied to the conductive resin 40, however, dielectric breakdown occurs between the metallic fillers 40b. By this dielectric breakdown, the continuity of the conductive resin 40 can be secured, and the value of electrical resistance can be stabilized.

As shown in FIG. 2, the second electrode 32 is connected to a second conductive portion 46 by a bonding wire 45. The second conductive portion 46 consists of a part of a conductor 48. The conductor 48 constitutes a circuit member 47 attached to, for example, the flexure 14 with conductors. The conductor 48 comprises terminals. Some conductor other than the circuit member 47 may be used for the second conductive portion 46.

The circuit member 47 of the flexure 14 comprises an insulating layer 49 formed of an electrically insulating resin. Thus, the metal base 14a of the flexure 14 is electrically insulated from the second conductive portion 46 by the insulating layer 49. The insulating layer 49 maintains insulation between the first and second conductive portions 41 and 46.

As shown in FIG. 2, opposite end portions 30a and 30b of the piezoelectric body 30 are fixed to the baseplate 11 and hinge member 13, respectively, by an electrically insulating adhesive 50. Thus, the second electrode 32 is electrically insulated from the baseplate 11 and hinge member 13.

The pair of piezoelectric bodies 30 are contained in the opening 20 of the baseplate 11. These paired piezoelectric bodies 30 are configured to expand and contract by a well-known piezoelectric effect when impressed with a voltage. If one of the piezoelectric bodies 30 expands with the other contracted, for example, the distal end portion of the load beam 12 moves transversely relative to the tracks of a disk for an infinitesimal distance with respect to the baseplate 11.

The piezoelectric actuators 15 of the suspension 10 constructed in this manner are inspected by a processing device 60 shown in FIG. 2. The following is a description of the processing device 60 and a processing method for the piezoelectric actuators.

The processing device 60 comprises a circuit 61 connected to the first and second conductive portions 41 and 46. The circuit 61 comprises a pair of measurement probes 62 and 63. The one measurement probe 62 conducts to the first conductive portion 41 when it is caused to abut the conductive portion 41. The other measurement probe 63 conducts to the second conductive portion 46 when it is caused to abut the conductive portion 46.

The processing device 60 is provided with an AC voltage source 70. The AC voltage source 70 has a function to process an AC voltage supplied from the commercial power supply. As shown in FIG. 3, the AC voltage source 70 obtains an AC waveform voltage $V_2$ by adding a bias voltage $V_B$ to an AC voltage $V_1$ for capacitance measurement.

The bias voltage $V_B$ is high enough (e.g., 12 V) to cause dielectric breakdown in the conductive resin 40. The amplitude of the AC waveform voltage $V_2$ is, for example, ±1.4 V. The AC waveform voltage $V_2$ is applied between the first and second conductive portions 41 and 46 through the measurement probes 62 and 63 as a switch 71 is closed.

The switch 71 functions as inrush current generating means. If the switch 71 is closed, the AC waveform voltage $V_2$ is applied to the circuit 61. The moment the AC waveform voltage $V_2$ is applied to the circuit 61, an inrush current is produced in the circuit 61, corresponding to a potential difference (e.g., 12 V) of the bias voltage $V_B$. Dielectric breakdown can be caused in the conductive resin 40 by this inrush current, whereby the continuity of the conductive resin 40 can be secured. The switch 71 and AC waveform voltage $V_2$ obtained by the AC voltage source 70 constitute the inrush current generating means.

The processing device 60 comprises an arithmetic control circuit 75 and display unit 76. The arithmetic control circuit 75 functions as determination means. Specifically, the control circuit 75 measures the capacitance of each piezoelectric body 30 based on the AC waveform voltage $V_2$ with the continuity of the conductive resin 40 secured. Based on the thus measured capacitance, it is determined whether or not the piezoelectric body 30 is normal. The display unit 76 functions as display means for displaying the result of the determination. The display unit 76 may be a device that displays the determination result on a display panel, device that gives an alarm sound, or device that prints the determination result on paper.

Steps of procedure for inspecting the piezoelectric actuators 15 using the processing device 60 will now be described with reference to FIG. 4 and the like.

FIG. 4 shows an example of a flow of processing for inspecting the piezoelectric actuators 15. In a connection step (ST1) shown in FIG. 4, the measurement probes 62 and 63 (FIG. 2) are caused to contact the first and second conductive portions 41 and 46, respectively. Thereupon, the circuit 61 electrically conducts to the first and second conductive portions 41 and 46. While this is done, the switch 71 is off. The conductive resin 40 is in such an uncured state that the matrix resin 40a is not completely cured.

The AC voltage supplied from the commercial power supply is processed by the AC voltage source 70. As shown in FIG. 3, the AC voltage source 70 obtains the AC waveform voltage $V_2$ by adding the bias voltage $V_B$ to the AC voltage $V_1$ for capacitance measurement.

In a voltage application step (ST2), the switch 71 is closed so that the AC waveform voltage $V_2$ is applied between the first and second conductive portions 41 and 46 through the measurement probes 62 and 63.

Each piezoelectric body 30, like a capacitor, has properties as a dielectric. Thus, the moment the switch 71 is closed so that the AC waveform voltage $V_2$ is applied between the first and second conductive portions 41 and 46, an inrush current is produced in the circuit 61, based on the potential difference (e.g., 12 V) of the bias voltage $V_B$. If the conductive resin 40 has a continuity failure, therefore, the inrush current causes dielectric breakdown in the defective part of the conductive resin 40. The continuity of the conductive resin 40 can be secured by this dielectric breakdown. This step is a dielectric breakdown step (ST3). This dielectric breakdown step (ST3) is performed before the resin is completely cured.

In the dielectric breakdown step (ST3), the dielectric breakdown is caused in the conductive resin 40 to secure the continuity of the resin 40 and stabilize the value of electrical resistance. The conductive resin 40 is completely cured thereafter. Depending on the mixing condition of the metallic fillers 40b in the matrix resin 40a, the conductive resin 40 may already be caused to fully conduct so that the value of electrical resistance is stable before the dielectric breakdown step (ST3) is performed.

In the embodiment described above, the inrush current for the dielectric breakdown is produced the moment the switch 71 is closed with the measurement probes 62 and 63 previously caused to contact the first and second conductive portions 41 and 46, respectively. As in an alternative embodiment, however, the inrush current may be allowed to flow by causing the one measurement probe 62 to contact the first conductive portion 41 in such a state that the switch 71 is previously closed with the probe 62 kept off the conductive portion 41, for example.

After the dielectric breakdown step (ST3) is finished, a measurement step (ST4) is consecutively performed. In the measurement step (ST4), the capacitance of each piezoelectric body 30 is measured. In the measurement step (ST4), the AC waveform voltage $V_2$ is applied between the electrodes 31 and 32 with the continuity of the conductive resin 40 secured after the production of the inrush current. Then, the capacitance of the piezoelectric body 30 is measured by the arithmetic control circuit 75. The capacitance of the piezoelectric body 30 is measured as the AC waveform voltage $V_2$ with the amplitude of, for example, ±1.4 V is applied to the piezoelectric body 30 through the measurement probes 62 and 63.

In a determination step (ST5), it is determined whether or not the capacitance measured in the measurement step (ST4) is within the range of reference values. If the measured capacitance is within the reference value range, the piezoelectric body 30 concerned is determined to be normal. If not, this piezoelectric body 30 is not determined to be normal. The result of this determination is displayed on the display unit 76 in a display step (ST6).

According to the processing method using the processing device 60 of the present embodiment, as described above, it is unnecessary to reconnect the measurement probes 62 and 63 or change the energy source between the dielectric breakdown step (ST3) and measurement step (ST4). Accordingly, the dielectric breakdown step (ST3), measurement step (ST4), and determination step (ST5) can be consecutively performed in a short time.

Conventionally, on the other hand, steps of dielectric breakdown and capacitance measurement are performed separately. In this case, the energy source needs to be changed from a DC voltage source to an AC voltage source, so that the operation is time-consuming. In addition, the positions where the probes are caused to abut the conductive portions for the dielectric breakdown are conventionally different from the contact positions for the capacitance measurement. Therefore, the probes are caused more frequently to contact the piezoelectric actuators, so that the chance of the actuators being damaged is increased correspondingly.

According to the present embodiment, the common AC waveform voltage $V_2$ produced from the AC voltage source 70 is used in the dielectric breakdown step (ST3) and measurement step (ST4). In addition, the dielectric breakdown step (ST3) and measurement step (ST4) can be consecutively performed with the measurement probes 62 and 63 kept in contact with the first and second conductive portions 41 and 46, respectively. Thus, the dielectric breakdown step (ST3) and measurement step (ST4) can be performed efficiently. Since the frequency of the measurement probes 62 and 63 being caused to contact the piezoelectric actuators 15 is reduced, moreover, there is less chance of the actuators 15 being damaged.

It is to be understood, in carrying out the present invention, that the structures and arrangements of the constituent elements of the invention, including the circuit and probes that constitute the processing device, first and second conductive portions, AC voltage source, inrush current generating means, determination means, display means, etc., as well as the configurations of the piezoelectric actuators and conductive resin, may be suitably modified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A processing device for inspecting a piezoelectric actuator of a disk drive suspension, the piezoelectric actuator comprising a piezoelectric body disposed between a first electrode and a second electrode, an electrically conductive resin attached to the first electrode and comprising a matrix resin doped with a metallic filler, a first conductive portion conducting to the first electrode through the conductive resin, and a second conductive portion electrically insulated from the first conductive portion and conducting to the second electrode, the processing device comprising:
    a circuit connected to the first conductive portion and the second conductive portion through measurement probes;
    an AC voltage source which applies an AC waveform voltage, obtained by adding a bias voltage to an AC voltage for capacitance measurement, between the first conductive portion and the second conductive portion through the measurement probes;
    inrush current generating means for causing dielectric breakdown in the conductive resin by means of an inrush current produced in the circuit, based on a potential difference of the bias voltage, thereby securing conduction, the moment the AC waveform voltage is applied;
    determination means for measuring a capacitance of the piezoelectric body by the AC waveform voltage, with the continuity of the conductive resin secured, and determining whether or not the piezoelectric body is normal, based on the measured capacitance; and
    display means for displaying a result of the determination by the determination means.

2. A processing method for inspecting a piezoelectric actuator of a disk drive suspension, the piezoelectric actuator comprising a piezoelectric body disposed between a first electrode and a second electrode, an electrically conductive resin attached to the first electrode and comprising a matrix resin doped with a metallic filler, a first conductive portion conducting to the first electrode through the conductive resin, and a second conductive portion electrically insulated from the first conductive portion and conducting to the second electrode, the processing method comprising:
    forming a circuit by causing measurement probes to contact the first conductive portion and the second conductive portion;
    applying an AC waveform voltage, obtained by adding a bias voltage to an AC voltage for capacitance measurement, to the circuit;
    causing dielectric breakdown in the conductive resin by means of an inrush current produced in the circuit, based on a potential difference of the bias voltage, thereby securing conduction, the moment the AC waveform voltage is applied;
    measuring a capacitance of the piezoelectric body by the AC waveform voltage, with the continuity of the conductive resin secured after the inrush current is produced;
    determining whether or not the piezoelectric body is normal, based on the measured capacitance; and
    displaying a result of the determination.

* * * * *